May 8, 1928.
E. H. STEIN
CHECK ROW ATTACHMENT FOR PLANTERS
Filed May 16 1927
1,668,827
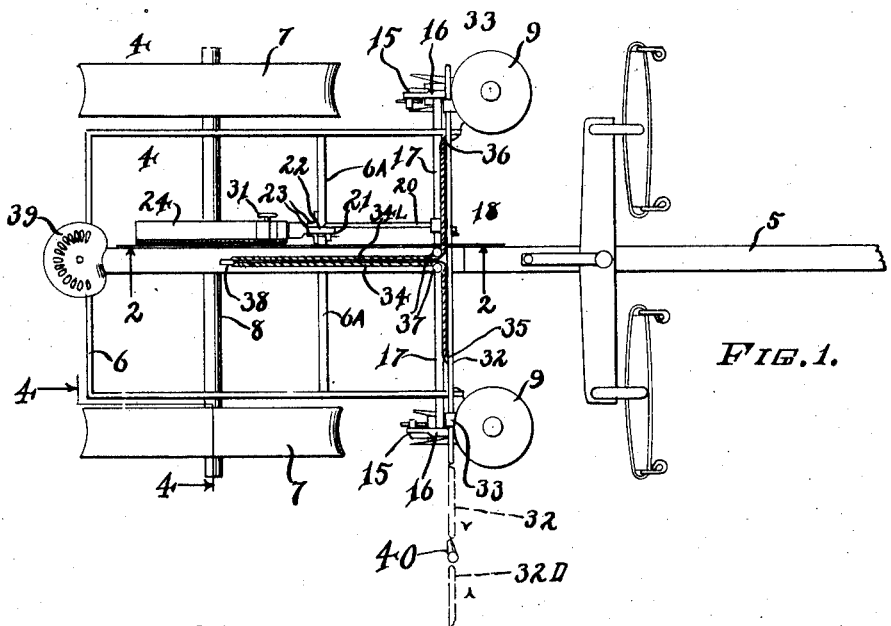
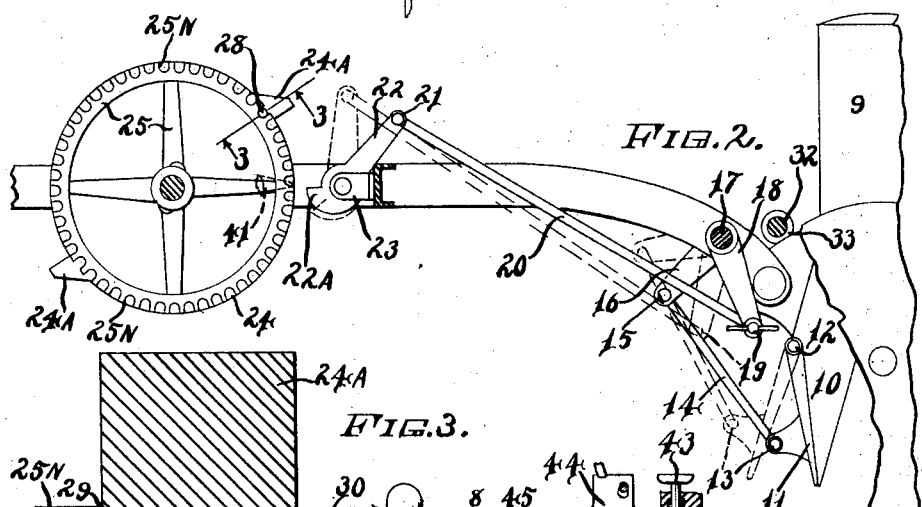
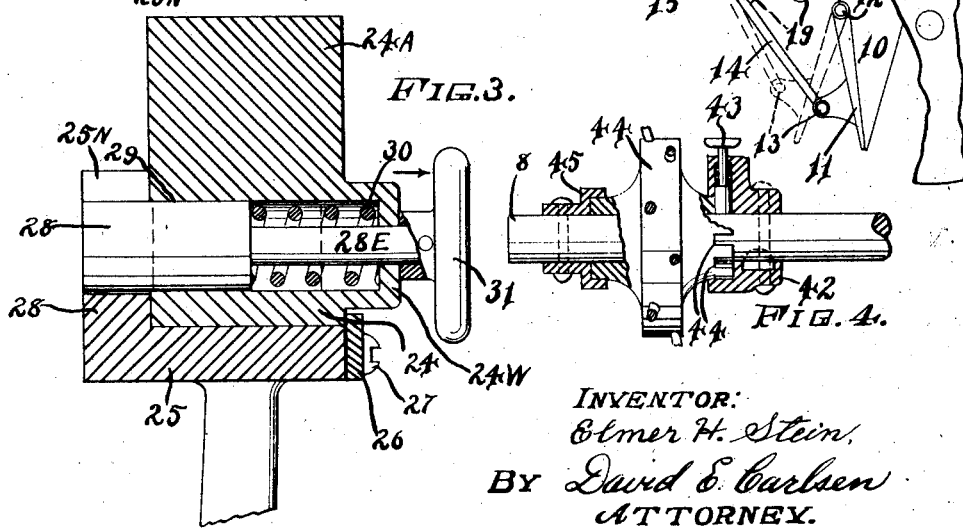
INVENTOR:
Elmer H. Stein,
BY David E. Carlsen
ATTORNEY.

Patented May 8, 1928.

1,668,827

UNITED STATES PATENT OFFICE.

ELMER H. STEIN, OF PEPIN, WISCONSIN.

CHECKROW ATTACHMENT FOR PLANTERS.

Application filed May 16, 1927. Serial No. 191,634.

My invention relates to an improved check-row attachment for corn planters and the object is to provide a simple and efficient device readily adapted and arranged in conjunction with the seed releasing means of a corn planter to provide for evenly spaced seed planting in check rows.

Other objects will be set forth in the following description, reference being had to the accompanying drawing, in which, Fig. 1 is a top view of a corn planter embodying my improved device.

Fig. 2 is a longitudinal sectional elevation in enlarged scale, about as on line 2—2 in Fig. 1.

Fig. 3 is an approximately full sized sectional view of the check wheel of my device at its check lug, as at 3—3 in Fig. 2.

Fig. 4 is an enlarged sectional elevation of the central part of either ground wheel of the corn planter, about as on line 4—4 in Fig. 1.

Referring to the drawing by reference numerals, 5 designates the draft pole of a corn planter, 6 the main frame, 7 the ground wheels, and 8 the wheel axle suitably journaled transversely of the said frame. 9 are the usual two seed hoppers mounted each forward of a wheel 7, said hoppers having the usual downwardly directed outlets 10 each with a closure 11 hinged at 12 and connected at 13 to a rod 14, the rear end of which is pivotally connected at 15 in the outer end of a lever 16 suitably fixed on a transverse shaft 17 journaled in the main frame. Said shaft 17 is oscillated by a lever 18 fixed on it and depending therefrom. At the lower end of said lever 18 is connected at 19 a reach rod 20 extending rearwardly and connected at 21 to the upper end of a trip lever 22 fulcrumed in a bracket 23, preferably on a cross arm 6$^A$ of the main frame. The hub part of said lever 22 is enlarged and formed with a rearwardly extending and upwardly directed cam face 22$^A$. This cam face is in the path of the cam arms or lugs 24$^A$ on the perimeter of metal ring 24, mounted concentrically on the rim of a wheel 25, suitably fixed on the axle 8, (see Fig. 3). Said wheel has a radially extending flange with a perimetral row of outwardly opening notches 25$^N$, said ring 24 being slidably fixed between said flange and a detachable ring 26 secured as with screws 27 on the rim face of said wheel opposite from its flanged side, (see Fig. 3).

It will be readily understood that when the planter is in motion the lugs 24$^A$ will engage the cam face 22$^A$ successively to open the seed releasing means above described.

The wheel 25 is made in certain predetermined size according to the diameter of the ground wheels, so that the seed will be dropped certain distances apart.

As previously mentioned, the ring 24 is rotatable on the rim of wheel 25 and may be locked to each other by means of a slidable pin 28 arranged in a transverse bore 29 of ring 24, preferably in one of the lugs 24$^A$, as shown. The pin 28 is pressed outwardly by a coil spring 30 in the bore 29 which has an end web 24$^W$ through which the reduced end 28$^E$ projects and its outer end carries a handwheel or knob 31. The pin is so located that when in normal position as in Fig. 3, it engages and rests in any one of the notches 25$^N$ of wheel 25, thus locking the wheel and ring together.

32 is a transversely mounted bar slidable in suitable bearings 33 at or near each seed hopper. It is moved outwardly to right or left by means of a rope 34 fixed with its two ends equidistant from the center as at 35 and 36 in Fig. 1, and extending from these parts toward the center over pulleys 37 and then rearwardly and suitably retained in the frame tilting lever 38 just forward of the driver's seat 39. This bar 32 will hereinafter be termed a marker bar and is used as follows:

When a corn planter has reached the end of a row, the machine is stopped. Then the driver pulls the left hand bight 34$^L$ of the rope 34, (as in Fig. 1), causing marker bar 32 to be projected outwardly to the right and he then drives a stake 40 into the ground in alinement with and outwardly of the end of the projected marker bar. It is assumed now that the wheel 25 is in position shown in Fig. 2, the upper lug 24$^A$, is six notches above an indicator 41 arranged horizontally forward of axle 8. It is necessary with my device that the wheels 7 are detachably locked to the axle 8. This is done by providing a fixed collar 42 on the axle adjacent each wheel and having an inwardly radially spring pressed pin 43 to normally engage in any one of a row of notches 44$^N$ in the adjacent and inner end of the wheel hub 44. 45 is an outer fixed collar on the axle 8 to retain said hub between it and the collar 42. Thus either or both wheels may be released from driving axle 8.

Now the operator may release the left hand wheel 7 by the means described and turn the planter around, as to the right to go in the opposite direction bringing the planter in position so that the projecting marker bar 32 comes in alinement or close to stake 40 but on the opposite sides thereof as indicated by dotted line 32$^D$ in Fig. 1. The left hand or either or both of the ground wheels being free to turn on the axle, the latter does not rotate during the turning of the planter and thus the cam wheel is in same position as it was when the end of the row was reached at the time when the planter is again in position to start the return and is located in alinement with the stake. In this latter position, the driver releases the cam rim by pulling out the knob 31, releasing pin 28 from notches 25$^N$. Then he rotates ring 24 until the right hand lug 24, (Fig. 2), is moved six notches below the horizontal marker 41. Then the left hand lug 24 will be located above the horizontal center line and as the planter is started up this lug will trip the seed releasing means so that the corn "hills" will thus be located in transversely registering alinement. If the planter should be in starting position, say two inches ahead of or behind the stake, the driver makes compensating allowance for said variation in relocking the ring 24 to wheel 25, by replacing the ring 7 or 5 inches below the indicator 41. In starting the new row as just described it is understood that the wheels must again be locked to the axle with the means described.

My device is particularly adapted for planters with 30 inch ground wheels, the pitch circle of the ring teeth 25$^N$ is ½ the diameter of the ground wheels and there is one notch for each two inches on the rim of the ground wheels and there are two "hills" of corn planted for each full turn of the ground wheels. In this size of planter, the corn "hills" are spaced uniformly and approximately four feet apart.

I claim:

In a check-row attachment for planters having a main frame supported on a pair of ground wheels and an axle rotated by said wheels, seed hoppers and seed releasing means fixed to said hoppers; said check row device comprising a wheel fixed on said axle intermediate the ground wheels and having a rim of L shape in cross section, a trip ring slidably mounted concentric on said rim and having a predetermined number of projecting lugs arranged to trip the seed releasing means, one flange of said L shaped rim being provided with a circular row of notches adjacent said trip ring, a spring pressed pin arranged in said ring to normally engage one of said notches and adapted to be retracted from said position to rotate the ring and set the lugs in desired position relative to the seed releasing means, said latter means comprising a cam lever operatively connected with said seed releasing means and having a radial face arranged in the path of said lugs; and means for releasing the ground wheels from rotating the axle when the planter is to be turned at the end of a row and a marker device mounted on the frame to transversely register positions of seeds planted in adjacent rows.

In testimony whereof I affix my signature.

ELMER H. STEIN